(12) United States Patent
Kim et al.

(10) Patent No.: US 12,221,160 B2
(45) Date of Patent: Feb. 11, 2025

(54) VEHICLE BODY SIDE STRUCTURE

(71) Applicants: Hyundai Motor Company, Seoul (KR); Kia Corporation, Seoul (KR)

(72) Inventors: Keon Woo Kim, Hwaseong-si (KR); Min Cheol Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 301 days.

(21) Appl. No.: 17/929,129

(22) Filed: Sep. 1, 2022

(65) Prior Publication Data

US 2023/0303182 A1  Sep. 28, 2023

(30) Foreign Application Priority Data

Mar. 25, 2022 (KR) .................. 10-2022-0037591

(51) Int. Cl.
| | |
|---|---|
| *B62D 25/04* | (2006.01) |
| *B62D 25/02* | (2006.01) |
| *B62D 21/15* | (2006.01) |
| *B62D 25/08* | (2006.01) |
| *B62D 25/16* | (2006.01) |
| *B62D 27/02* | (2006.01) |

(52) U.S. Cl.
CPC .......... *B62D 25/04* (2013.01); *B60Y 2306/01* (2013.01); *B62D 21/15* (2013.01); *B62D 25/02* (2013.01); *B62D 25/025* (2013.01); *B62D 25/08* (2013.01); *B62D 25/16* (2013.01); *B62D 27/023* (2013.01)

(58) Field of Classification Search
CPC ...... B62D 25/04; B62D 25/025; B62D 21/15; B62D 25/16; B62D 25/02; B62D 25/08; B62D 27/023; B60Y 2306/01
USPC ............... 296/193.06, 203.03, 209; 474/252
See application file for complete search history.

(56) References Cited

U.S. PATENT DOCUMENTS

| | | | |
|---|---|---|---|
| 8,371,643 B2* | 2/2013 | Itakura ................ | B62D 25/025 |
| | | | 296/203.03 |
| 9,381,956 B2* | 7/2016 | Kishima ............. | B62D 25/025 |
| 2015/0246692 A1* | 9/2015 | Rangaswamaiah .... | B62D 21/15 |
| | | | 296/193.06 |

* cited by examiner

*Primary Examiner* — Amy R Weisberg
*Assistant Examiner* — Dana D Ivey
(74) *Attorney, Agent, or Firm* — Slater Matsil, LLP (57) ABSTRACT

An embodiment vehicle body side structure includes a front pillar located behind a front wheel, the front pillar comprising a chamfer surface that is diagonally inclined from a lower portion of the front pillar towards an interior of a vehicle, the chamfer surface being aligned with the front wheel in a longitudinal direction of the vehicle, and a side sill connected to the lower portion of the front pillar.

18 Claims, 13 Drawing Sheets

VEHICLE BODY SIDE STRUCTURE

CROSS-REFERENCE TO RELATED APPLICATIONS

This application claims the benefit of Korean Patent Application No. 10-2022-0037591, filed on Mar. 25, 2022, which application is hereby incorporated herein by reference.

TECHNICAL FIELD

The present disclosure relates to a vehicle body side structure.

BACKGROUND

In the event of a frontal collision/impact or a small overlap crash of a vehicle, a front wheel may collide with a dash panel or a front pillar, and then the front wheel may intrude into a passenger compartment. When the front wheel intrudes into the passenger compartment during a vehicle collision, a driver or an occupant may be injured.

To cope with this problem, there is provided a technique for separating the front wheel from a vehicle body by causing a chassis-side lower arm to be damaged in the event of the vehicle collision.

However, if there is an error in a hitting position of a barrier, the chassis-side lower arm may not be completely damaged, so the front wheel may not be separated from the vehicle body. When the front wheel is not separated from the vehicle body, the front wheel may hit the front pillar, and accordingly it may be required to relatively increase a lower cross-sectional area of the front pillar for absorbing impact energy. In addition, a plurality of reinforcements may need to be mounted on the lower portion of the front pillar, which may increase the weight and cost of the front pillar.

The above information described in this background section is provided to assist in understanding the background of the inventive concept, and may include any technical concept which is not considered as the prior art that is already known to those skilled in the art.

SUMMARY

The present disclosure relates to a vehicle body side structure. Particular embodiments relate to a vehicle body side structure improving crashworthiness.

Embodiments of the present disclosure can solve problems occurring in the prior art while advantages achieved by the prior art are maintained intact.

An embodiment of the present disclosure provides a vehicle body side structure configured to deflect or turn a front wheel outwards away from the vehicle during a frontal collision/impact or a small overlap crash of the vehicle, thereby preventing the front wheel from intruding into a passenger compartment and improving crashworthiness.

According to an embodiment of the present disclosure, a vehicle body side structure may include a front pillar located behind a front wheel and a side sill connected to a lower portion of the front pillar. The front pillar may include a chamfer surface which is diagonally inclined from the lower portion thereof toward the interior of the vehicle, and the chamfer surface may be aligned with the front wheel in a longitudinal direction of the vehicle.

As the chamfer surface is aligned with the front wheel, the front wheel may be deflected or turned outwards while moving over the chamfer surface during a frontal collision/impact or a small overlap crash of the vehicle.

The front pillar may include an inboard panel facing the interior of the vehicle and an outboard panel facing the exterior of the vehicle, and the chamfer surface may be provided on a lower portion of the outboard panel.

The outboard panel may have an opening-side flange facing a door opening of the vehicle and a front flange facing the front of the vehicle. The chamfer surface may extend from the opening-side flange of the outboard panel toward the front flange of the outboard panel.

The chamfer surface may be located between the opening-side flange and the front flange, and a length of the chamfer surface may be substantially equal to a distance between the opening-side flange and the front flange.

The front flange of the outboard panel may be offset from a longitudinal center plane of the front wheel toward the interior of the vehicle.

As the front flange of the outboard panel is offset from the longitudinal center plane of the front wheel toward the interior of the vehicle, the front wheel may be deflected or turned outwards away from the vehicle during a frontal collision or a small overlap crash of the vehicle.

A front portion of the side sill may be interposed between the outboard panel and the inboard panel, and the front portion of the side sill may be fixed to the lower portion of the front pillar.

The side sill may include a side sill inner facing the interior of the vehicle and a side sill outer facing the exterior of the vehicle. A front portion of the side sill outer may be aligned with a lower portion of the chamfer surface.

As the side sill outer is aligned with the lower portion of the chamfer surface, stiffness and strength of the front pillar may be improved.

The front portion of the side sill outer may have an auxiliary chamfer surface which is inclined to the interior of the vehicle, and the auxiliary chamfer surface may be aligned with the lower portion of the chamfer surface.

As the auxiliary chamfer surface of the side sill outer is aligned with the chamfer surface of the front pillar, stiffness of the front pillar and stiffness of the side sill outer may be improved.

The vehicle body side structure may further include a chamfer-side reinforcement disposed in an internal space between the inboard panel and the outboard panel, and the chamfer-side reinforcement may be aligned with an upper portion of the chamfer surface.

As the chamfer-side reinforcement is aligned with the upper portion of the chamfer surface, stiffness and strength of the front pillar may be improved.

The chamfer-side reinforcement may have an auxiliary chamfer surface which is inclined to the interior of the vehicle, and the auxiliary chamfer surface may be aligned with the upper portion of the chamfer surface.

As the auxiliary chamfer surface of the chamfer-side reinforcement is aligned with the chamfer surface of the front pillar, stiffness of the front pillar and stiffness of the side sill outer may be improved.

The chamfer-side reinforcement may include a front flange fixed to the front flange of the outboard panel, a bottom flange connected to the side sill outer, and a rear edge spaced apart from the opening-side flange of the outboard panel.

As the chamfer-side reinforcement is connected to the front pillar through the front flange and is connected to the side sill outer through the bottom flange, a load may be transferred in a height direction of the front pillar and a longitudinal direction of the side sill. Since the rear edge of the chamfer-side reinforcement is not directly connected to the opening-side flange of the front pillar, a load applied to the chamfer-side reinforcement may be prevented from being transferred to the opening-side flange of the front pillar, and thus deformation of the opening-side flange of the front pillar may be prevented or minimized.

A longitudinal center line of the chamfer surface may be substantially aligned with a wheel center line of the front wheel, and the longitudinal center line of the chamfer surface and the wheel center line of the front wheel may be parallel to the longitudinal direction of the vehicle.

As the longitudinal center line of the chamfer surface is aligned with the wheel center line of the front wheel, deflection of the front wheel may be accurately guided to the outside of the vehicle along the chamfer surface in the event of a vehicle collision.

The chamfer surface may be aligned with a middle region of the front wheel, and the middle region of the front wheel may be a portion of the front wheel between a half point of a radius located above a center point of the front wheel and a half point of a radius located below the center point of the front wheel.

As the chamfer surface is aligned with the middle region of the front wheel, deflection of the front wheel may be accurately guided to the outside of the vehicle along the chamfer surface in the event of a vehicle collision.

The vehicle body side structure may further include a fender apron member extending from the front pillar toward the front of the vehicle, a fender apron lower member diagonally extending from the fender apron member to the front pillar, and a fender-side reinforcement disposed in the internal space between the inboard panel and the outboard panel. A bottom end of the fender apron lower member may be fixed to the fender-side reinforcement, and the fender-side reinforcement may be located above the chamfer-side reinforcement.

The fender-side reinforcement may be connected to the chamfer-side reinforcement.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with embodiments of the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
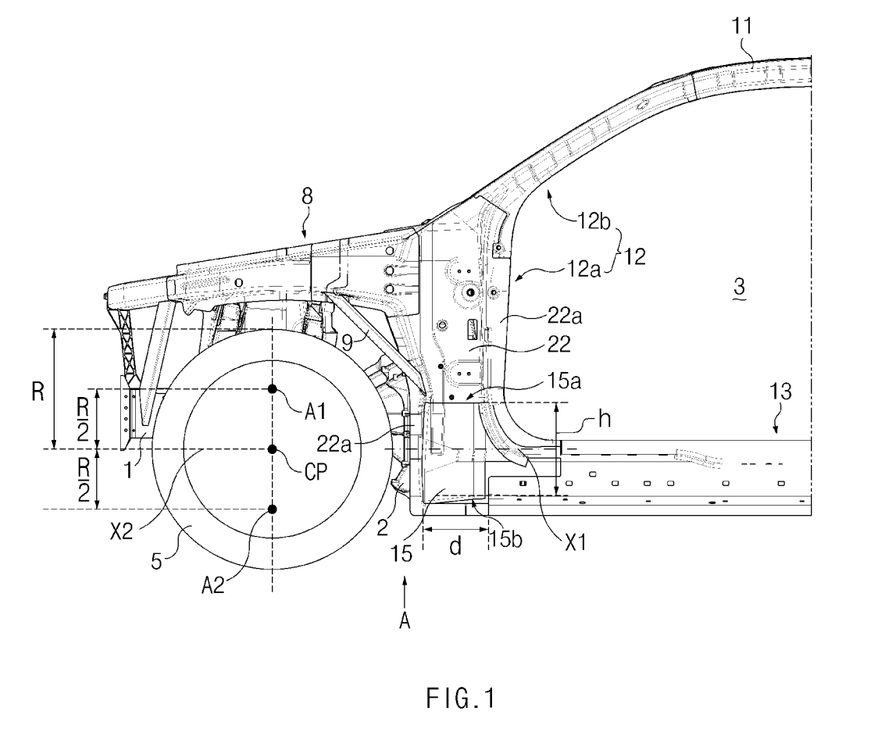
FIG. 1 illustrates a side view of a front portion of a vehicle body side structure according to an exemplary embodiment of the present disclosure.

Referring to FIG. 1, a vehicle body side structure according to an exemplary embodiment of the present disclosure may include a roof side rail 11, a front pillar 12 connected to a front portion of the roof side rail 11, and a side sill 13 connected to a lower portion of the front pillar 12.

A pair of roof side rails ii may be spaced apart from each other in a width direction of the vehicle. In FIG. 1, only the left roof side rail 11 is shown, and a right roof side rail is not shown. A pair of front pillars 12 may be spaced apart from each other in the width direction of the vehicle. In FIG. 1, only the left front pillar 12 is shown, and a right front pillar is not shown. A pair of side sills 13 may be spaced apart from each other in the width direction of the vehicle. In FIG. 1, only the left side sill 13 is shown, and a right side sill is not shown.

A pair of fender apron members 8 may be connected to the pair of front pillars 12, respectively. Each fender apron member 8 may extend in a longitudinal direction of the vehicle. Each fender apron member 8 may extend from the corresponding front pillar 12 toward the front of the vehicle. Referring to FIG. 1, the left fender apron member 8 may extend from the left front pillar 12 toward the front of the vehicle. A right fender apron member (not shown) may extend from the right front pillar (not shown) toward the front of the vehicle.

Figure 2:
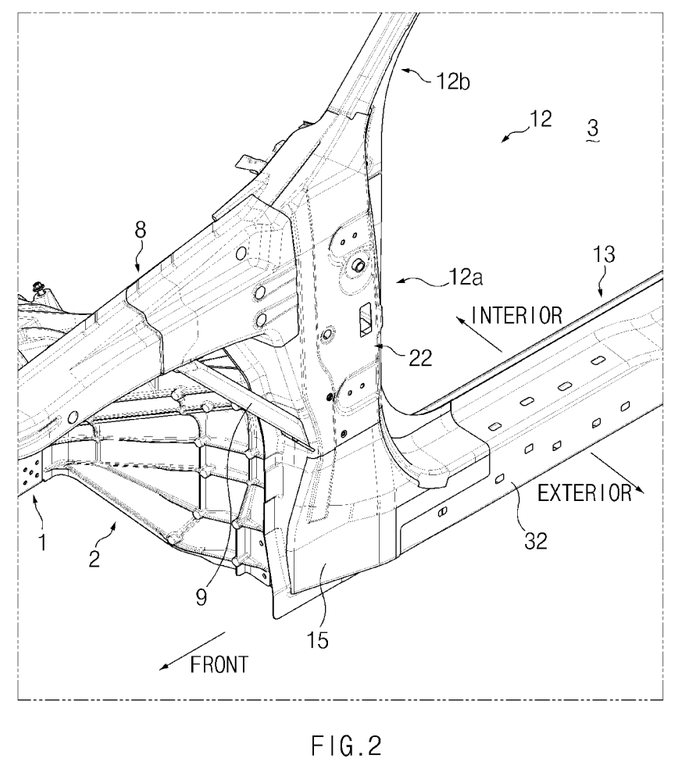
FIG. 2 illustrates a perspective view of a front portion of a vehicle body side structure according to an exemplary embodiment of the present disclosure.

A fender apron lower member 9 may connect the corresponding fender apron member 8 and the corresponding front pillar 12 in a diagonal direction. Referring to FIG. 2, the left fender apron lower member 9 may connect the left fender apron member 8 and the left front pillar 12 in the diagonal direction. A right fender apron lower member (not shown) may connect the right fender apron member and the right front pillar in the diagonal direction. A top end of each fender apron lower member 9 may be fixed to the corresponding fender apron member 8 using fasteners, welding, and/or the like, and a bottom end 9a of each fender apron lower member 9 may be fixed to a middle portion of the corresponding front pillar 12 using fasteners, welding, and/or the like.

The pair of side sills 13 may be connected to the pair of front pillars 12, respectively. Referring to FIG. 2, the left side sill 13 may be connected to the lower portion of the left front pillar 12. The right side sill (not shown) may be connected to the lower portion of the right front pillar (not shown).

A pair of front side members 1 may be connected to the pair of side sills 13 through a pair of rear lower members 2, respectively. Referring to FIG. 1, the left front side member 1 may be connected to the left side sill 13 through the rear lower member 2. A right front side member (not shown) may be connected to the right side sill (not shown) through the rear lower member. Referring to FIG. 2, a front portion of the rear lower member 2 may be joined to a rear portion of the corresponding front side member 1, and a rear portion of the rear lower member 2 may be joined to the corresponding front pillar 12 and the corresponding side sill 13.

A pair of front wheels 5 may be located in front of the pair of front pillars 12, respectively. Referring to FIG. 1, the left front wheel 5 may be located in front of the left front pillar 12 and be spaced apart from the left front pillar 12. A right front wheel (not shown) may be located in front of the right front pillar (not shown) and be spaced apart from the right front pillar. Each front wheel 5 may be protected by a wheel house (not shown).

Referring to FIGS. 1 and 2, the front pillar 12 may include a front pillar lower 12a connected to the side sill 13, and a front pillar upper 12b connected to the roof side rail 11. A bottom end of the front pillar upper 12b may be connected to a top end of the front pillar lower 12a.

Figure 3:
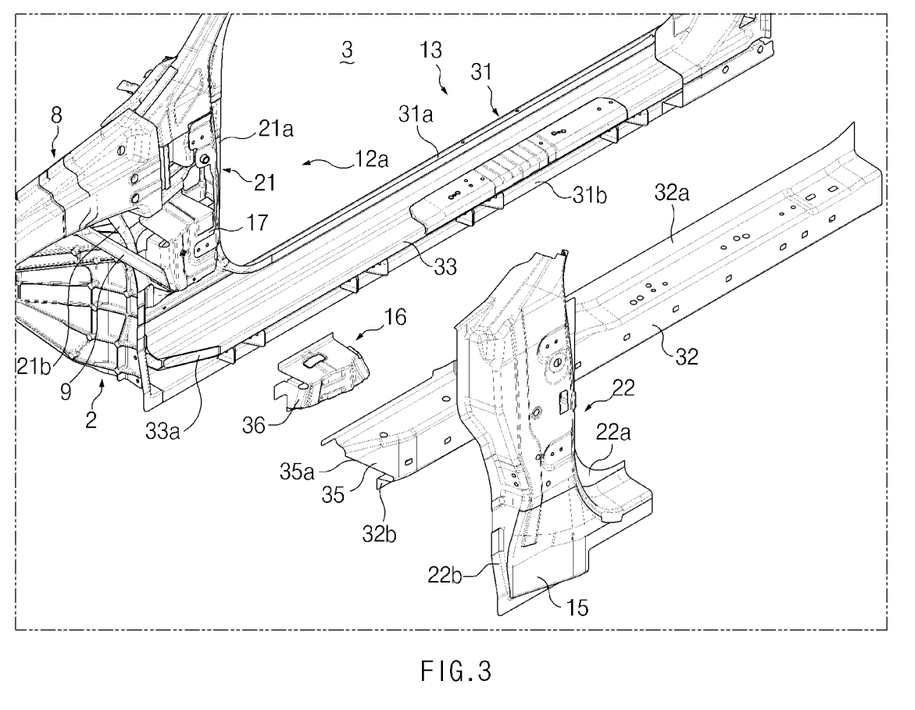
FIG. 3 illustrates an exploded perspective view of a front pillar and a side sill in the vehicle body side structure illustrated in FIG. 2.

Referring to FIG. 3, the front pillar lower 12a may include an inboard panel 21 facing the interior of the vehicle, and an outboard panel 22 facing the exterior of the vehicle. The inboard panel 21 and the outboard panel 22 may form a closed cross section, and the front pillar lower 12a may have an internal space defined by the inboard panel 21 and the outboard panel 22. The inboard panel 21 may have an opening-side flange 21a facing a door opening 3 and a front flange 21b facing the front of the vehicle. The outboard panel 22 may have an opening-side flange 22a facing the door opening 3 and a front flange 22b facing the front of the vehicle. The opening-side flange 21a of the inboard panel 21 may be fixed to the opening-side flange 22a of the outboard panel 22 using fasteners, welding, and/or the like, and the front flange 21b of the inboard panel 21 may be fixed to the front flange 22b of the outboard panel 22 using fasteners, welding, and/or the like.

Referring to FIGS. 1 and 2, the front pillar 12 may have a chamfer surface 15 provided on a lower portion of the outboard panel 22 of the front pillar lower 12a. The chamfer surface 15 may extend from the opening-side flange 22a of the outboard panel 22 toward the front flange 22b of the outboard panel 22. Referring to FIGS. 2, 3, 6, and 9, the chamfer surface 15 may be diagonally inclined from the lower portion of the front pillar lower 12a toward the interior of the vehicle, and accordingly a front end of the chamfer surface 15 may be located on a front portion of the front pillar lower 12a.

Referring to FIGS. 6 to 9, the chamfer surface 15 may be diagonally inclined from the outboard panel 22 of the front pillar lower 12a toward the interior of the vehicle, and accordingly the chamfer surface 15 may be diagonally inclined from the side of the vehicle toward the interior of the vehicle.

Referring to FIG. 1, the chamfer surface 15 may be aligned with the front wheel 5 in the longitudinal direction of the vehicle. The front wheel 5 may have a wheel center line X2 parallel to the longitudinal direction of the vehicle, and the wheel center line X2 may bisect a rotational axis of the front wheel 5. A longitudinal center line X1 of the chamfer surface 15 may be substantially aligned with the wheel center line X2 of the front wheel 5. The longitudinal center line X1 of the chamfer surface 15 may be parallel to the longitudinal direction of the vehicle. The chamfer surface 15 may be aligned with a middle region of the front wheel 5. Here, the middle region of the front wheel 5 may be a portion of the front wheel 5 between a half point R/2 of a radius R located above a center point CP of the front wheel 5 and a half point R/2 of a radius R located below the center point CP of the front wheel 5. The chamfer surface 15 may have a predetermined height h extending from an upper edge 15a to a lower edge 15b along a height of the front pillar 12 and a predetermined length d extending along a width of the front pillar 12 or along a length of the vehicle. The height h of the chamfer surface 15 may be substantially equal to a height of the middle region of the front wheel 5, and the length d of the lower edge 15b of chamfer surface 15 may correspond to a width of the front pillar 12. The chamfer surface 15 may extend from the opening-side flange 22a of the outboard panel 22 toward the front flange 22b of the outboard panel 22. In particular, the chamfer surface 15 may be located between the opening-side flange 22a and the front flange 22b of the outboard panel 22 of the front pillar lower 12a, and accordingly the length d of the chamfer surface 15 may be substantially equal to a distance between the opening-side flange 22a and the front flange 22b.

Figure 4:
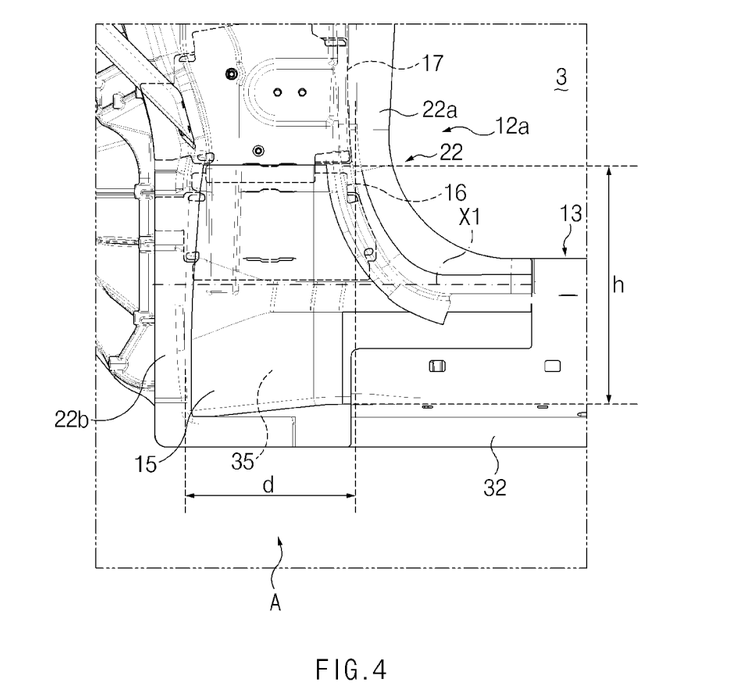
FIG. 4 illustrates a lower portion of a front pillar and a front portion of a side sill illustrated in FIG. 1.
Figure 5:
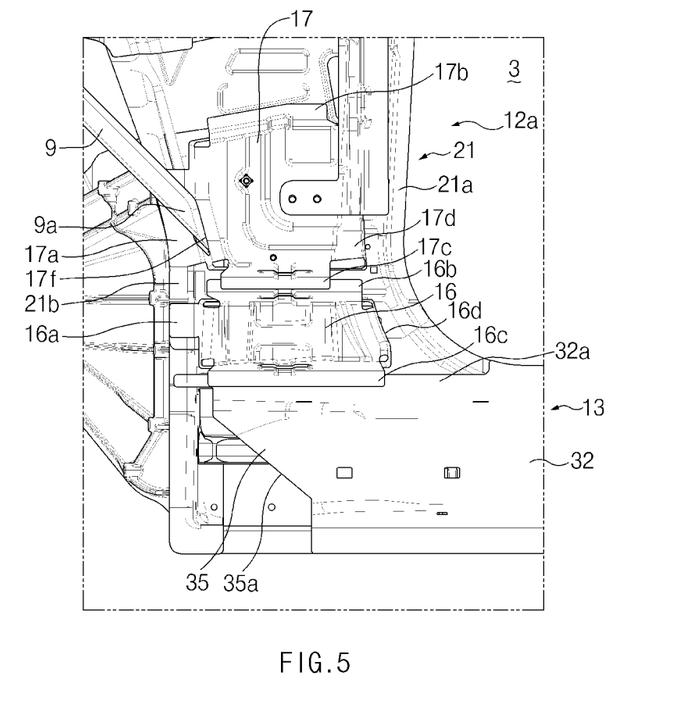
FIG. 5 illustrates a portion of the vehicle body side structure illustrated in FIG. 4, from which an outboard panel of a front pillar lower is removed.

Referring to FIGS. 3 to 5, a fender-side reinforcement 17 and a chamfer-side reinforcement 16 may be disposed in the internal space between the inboard panel 21 and the outboard panel 22 of the front pillar lower 12a. The fender-side reinforcement 17 may be located in a middle portion of the front pillar lower 12a, and the chamfer-side reinforcement 16 may be located below the fender-side reinforcement 17. In particular, the bottom end 9a of the fender apron lower member 9 may be fixed to the fender-side reinforcement 17 using fasteners, welding, and/or the like, and accordingly a load path may be defined between the fender apron member 8, the fender apron lower member 9, and the fender-side reinforcement 17. Thus, strength and stiffness of the front pillar 12 may be improved.

Referring to FIG. 5, the fender-side reinforcement 17 may include a front flange 17a facing the front of the vehicle, a top flange 17b facing the top of the vehicle, a bottom flange 17c facing the bottom of the vehicle, and a rear edge 17d facing the rear of the vehicle.

The front flange 17a and the top flange 17b, of the fender-side reinforcement 17 may be fixed to the front pillar lower 12a using fasteners, welding, and/or the like. Specifically, the front flange 17a of the fender-side reinforcement 17 may be fixed to the front flange 21b of the inboard panel 21 of the front pillar lower 12a and the front flange 22b of the outboard panel 22 of the front pillar lower 12a using fasteners, welding, and/or the like. The top flange 17b of the fender-side reinforcement 17 may be fixed to the inboard panel 21 using fasteners, welding, and/or the like. The rear edge 17d of the fender-side reinforcement 17 may be spaced apart from the opening-side flanges 21a and 22a of the front pillar lower 12a. Since the rear edge 17d of the fender-side reinforcement 17 is not directly connected to the front pillar lower 12a, a load applied to the fender-side reinforcement 17 may be prevented from being transferred to the opening-side flanges 21a and 22a of the front pillar lower 12a, and thus deformation of the opening-side flanges 21a and 22a of the front pillar lower 12a may be prevented or minimized.

Figure 12:
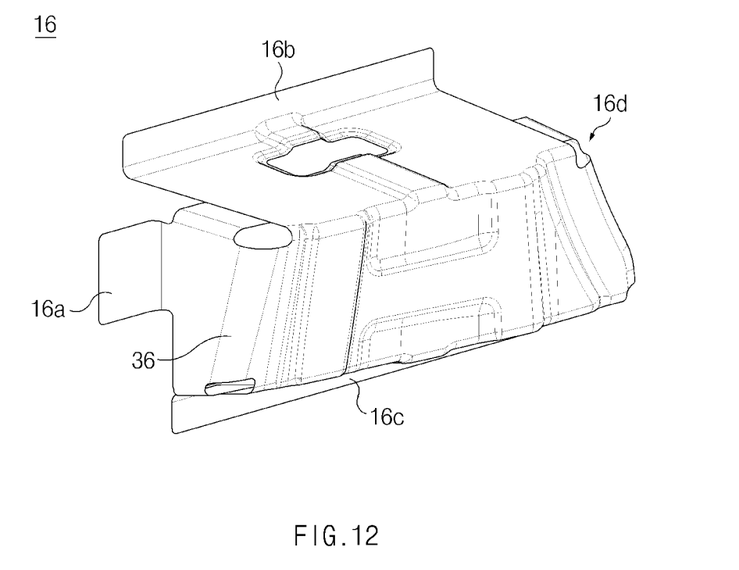
FIG. 12 illustrates a perspective view of a chamfer-side reinforcement in a vehicle body side structure according to an exemplary embodiment of the present disclosure.

Referring to FIG. 12, the chamfer-side reinforcement 16 may include a front flange 16a facing the front of the vehicle, a top flange 10 facing the top of the vehicle, a bottom flange 16c facing the bottom of the vehicle, and a rear edge 16d facing the rear of the vehicle.

The front flange 16a of the chamfer-side reinforcement 16 may be fixed to the front pillar lower 12a using fasteners, welding, and/or the like. Specifically, the front flange the of the chamfer-side reinforcement 16 may be fixed to the front flange 21b of the inboard panel 21 of the front pillar lower 12a and the front flange 22b of the outboard panel 22 of the front pillar lower 12a using fasteners, welding, and/or the like. The rear edge 16d of the chamfer-side reinforcement 16 may be spaced apart from the opening-side flanges 21a and 22a of the front pillar lower 12a. Since the rear edge 16d of the chamfer-side reinforcement 16 is not directly connected to the front pillar lower 12a, a load applied to the chamfer-side reinforcement 16 may be prevented from being transferred to the opening-side flanges 21a and 22a of the front pillar lower 12a, and thus deformation of the opening-side flanges 21a and 22a of the front pillar lower 12a may be prevented or minimized.

Referring to FIG. 5, the bottom flange 17c of the fender-side reinforcement 17 may be fixed to the top flange 16b of the chamfer-side reinforcement 16 using fasteners, welding, and/or the like. In particular, the bottom flange 17c of the fender-side reinforcement 17 may at least partially overlap the top flange 10 of the chamfer-side reinforcement 16. The bottom flange 16c of the chamfer-side reinforcement 16 may be fixed to a top flange 32a of a side sill outer 32 using fasteners, welding, and/or the like. The bottom flange 16c of the chamfer-side reinforcement 16 may at least partially overlap the top flange 32a of the side sill outer 32. The fender-side reinforcement 17, the chamfer-side reinforcement 16, and the side sill outer 32 may be connected in the height direction of the front pillar lower 12a so that the load transferred to the fender-side reinforcement 17 and/or the chamfer-side reinforcement 16 may be transferred in the height direction of the front pillar lower 12a and a longitudinal direction of the side sill 13.

Referring to FIGS. 2 and 4, the bottom end 9a of the fender apron lower member 9 may penetrate a front wall of the front pillar 12. Referring to FIG. 5, the bottom end 9a of the fender apron lower member 9 may be fixed to a front wall 17f of the fender-side reinforcement 17 using fasteners, welding, and/or the like. As the bottom end 9a of the fender apron lower member 9 is fixed to the fender-side reinforcement 17 provided inside the front pillar lower 12a, joining stiffness between the fender apron lower member 9 and the middle portion of the front pillar 12 may be increased, and a load path may be formed between the fender apron member 8, the fender apron lower member 9, and the front pillar 12.

Referring to FIGS. 3 and 4, the chamfer-side reinforcement 16 may be disposed to face the chamfer surface 15 of the outboard panel 22 in the internal space between the inboard panel 21 and the outboard panel 22. The chamfer-side reinforcement 16 may have an auxiliary chamfer surface 36 provided on a front portion thereof, and the auxiliary chamfer surface 36 may be diagonally inclined to the interior of the vehicle so as to match the chamfer surface 15 of the outboard panel 22 of the front pillar lower 12a. Referring to FIG. 3, the auxiliary chamfer surface 36 of the chamfer-side reinforcement 16 may face an upper portion of the chamfer surface 15 of the front pillar 12.

Referring to FIG. 3, a front portion of the side sill 13 may be interposed between the inboard panel 21 and the outboard panel 22 of the front pillar lower 12a, and the front portion of the side sill 13 may be fixed to the lower portion of the front pillar lower 12a.

The side sill 13 may include a side sill inner 31 facing the interior of the vehicle, the side sill outer 32 facing the exterior of the vehicle, and a side sill reinforcement 33 disposed between the side sill inner 31 and the side sill outer 32. The side sill inner 31 may have a top flange 31a and a bottom flange 31b, and the side sill outer 32 may have the top flange 32a and a bottom flange 32b. The top flange 31a of the side sill inner 31 may be fixed to the top flange 32a of the side sill outer 32 using fasteners, welding, and/or the like, and the bottom flange 31b of the side sill inner 31 may be fixed to the bottom flange 32b of the side sill outer 32 using fasteners, welding, and/or the like. A front portion of the side sill outer 32 may be disposed between a front portion of the side sill reinforcement 33 and the outboard panel 22 of the front pillar lower 12a, and the front portion of the side sill outer 32 may be aligned with a lower portion of the chamfer surface 15. The chamfer-side reinforcement 16 may be located above the front portion of the side sill outer 32 so that the chamfer-side reinforcement 16 may be aligned with the upper portion of the chamfer surface 15.

Referring to FIG. 3, the side sill reinforcement 33 may have an inclined surface 33a provided on the front portion thereof, and the inclined surface 33a of the side sill reinforcement 33 may be aligned with the lower portion of the chamfer surface 15.

Figure 13:
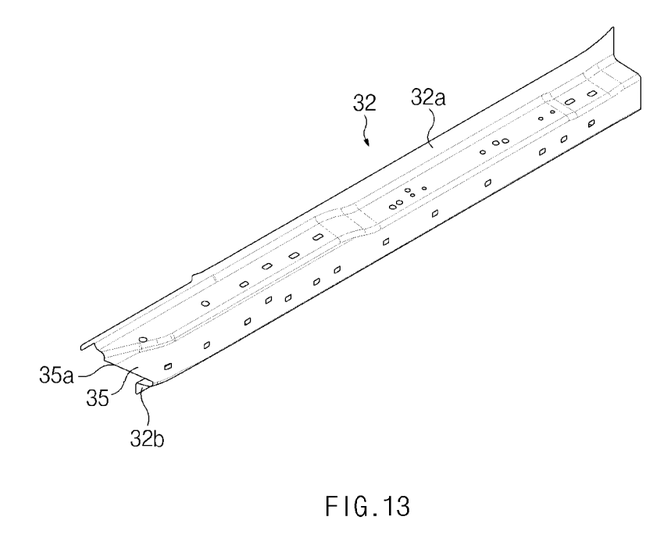
FIG. 13 illustrates a perspective view of a side sill outer in a vehicle body side structure according to an exemplary embodiment of the present disclosure.

Referring to FIGS. 3 and 13, the side sill outer 32 may have an auxiliary chamfer surface 35 provided on the front portion thereof, and the auxiliary chamfer surface 35 may have an inclined front edge 35a. Referring to FIG. 3, the auxiliary chamfer surface 35 may be diagonally inclined to the interior of the vehicle so as to match the chamfer surface 15 of the outboard panel 22 of the front pillar lower 12a. Referring to FIG. 3, the auxiliary chamfer surface 35 of the side sill outer 32 may be aligned with the inclined surface 33a of the side sill reinforcement 33 and the lower portion of the chamfer surface 15 of the front pillar 12.

Referring to FIG. 4, the chamfer-side reinforcement 16 may be located above the front portion of the side sill outer 32. In particular, the chamfer-side reinforcement 16 may be located higher than the longitudinal center line X1 of the chamfer surface 15 of the outboard panel 22, and the front portion of the side sill outer 32 may be located lower than the longitudinal center line X1 of the chamfer surface 15 of the outboard panel 22. Accordingly, the chamfer-side reinforcement 16 may be aligned with the upper portion of the chamfer surface 15, and the front portion of the side sill outer 32 may be aligned with the lower portion of the chamfer surface 15. The chamfer-side reinforcement 16 may be mounted in the internal space of the front pillar lower 12a, thereby supporting a load applied to the interior of the vehicle, and the side sill outer 32 may extend from the lower portion of the front pillar lower 12a in the longitudinal direction of the vehicle, thereby supporting a load applied in the longitudinal direction of the vehicle.

Figure 6:
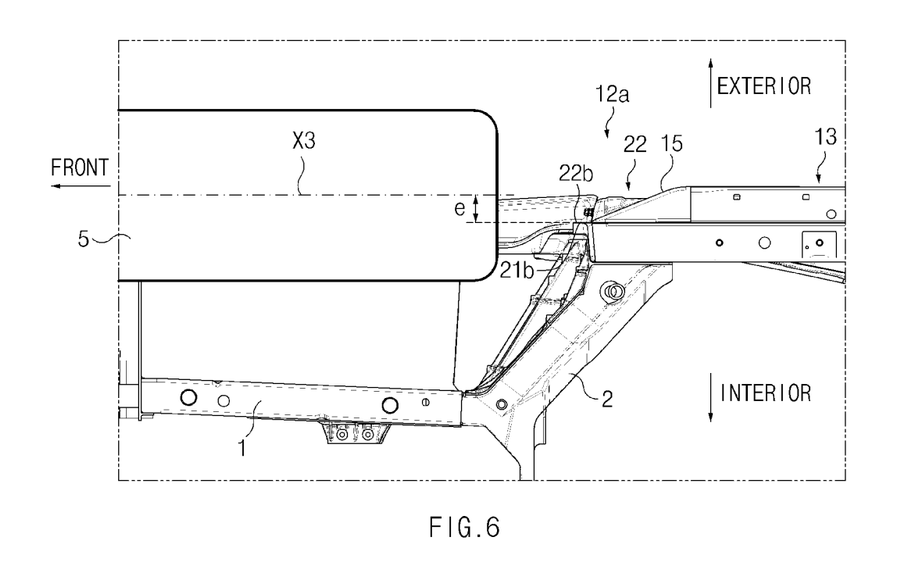
FIG. 6 illustrates a bottom view, which is viewed in a direction indicated by arrow A of FIG. 1.

Referring to FIG. 6, the front flange 22b of the outboard panel 22 and the front flange 21b of the inboard panel 21 may be offset from a longitudinal center plane X3 of the front wheel 5 toward the interior of the vehicle by a predetermined distance e. The longitudinal center plane X3 may be a plane extending from the center of the tread of the front wheel 5 in the longitudinal direction, and the longitudinal center plane X3 may be parallel to a driving direction of the vehicle or a longitudinal center axis of the vehicle. In particular, the front flange 22b of the outboard panel 22 provided with the chamfer surface 15 may be offset from the longitudinal center plane X3 of the front wheel 5 toward the interior of the vehicle so that the front wheel 5 may be deflected or turned outwards away from the vehicle during a frontal collision/impact or a small overlap crash of the vehicle.

Figure 7:
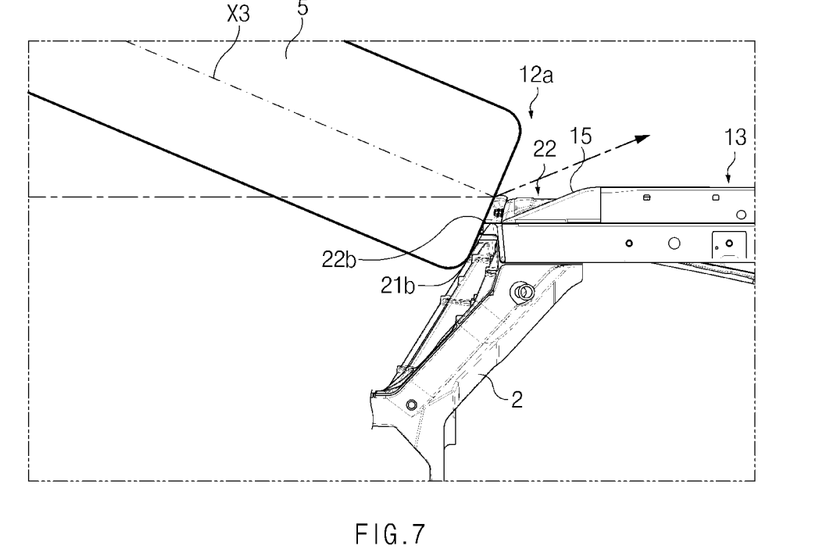
FIG. 7 illustrates a state in which a front wheel is deflected or turned outwards away from the vehicle through a chamfer surface during a frontal collision or a small overlap crash of the vehicle.

Referring to FIG. 7, when the front wheel 5 moves toward the front pillar lower 12a during a frontal collision or a small overlap crash, the front wheel 5 may be deflected or turned outwards by the front flanges 21b and 22b and the chamfer surface 15 of the front pillar lower 12a.

Figure 8:
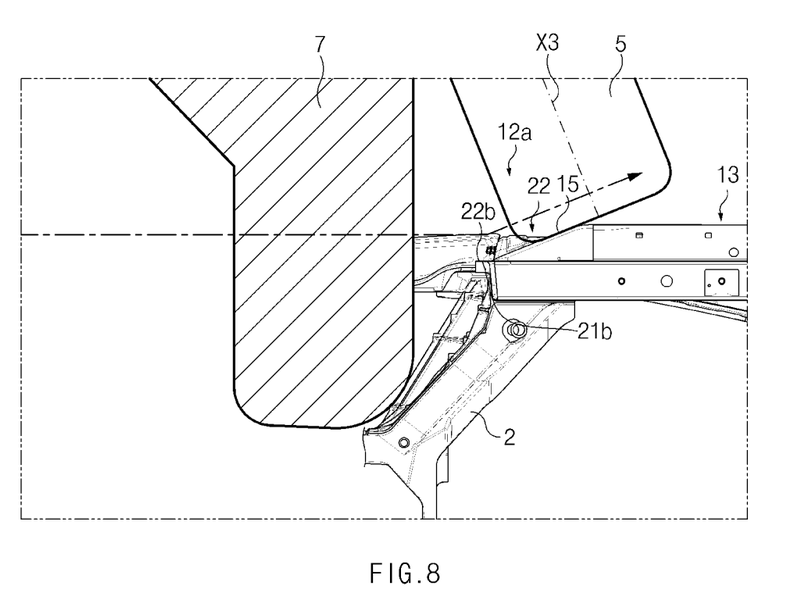
FIG. 8 illustrates a state in which a front wheel is completely separated from a vehicle body as a barrier hits the front wheel during a small overlap crash test of the vehicle.

Referring to FIG. 8, when a barrier 7 hits the front wheel 5 during a small overlap crash test, the front wheel 5 may be deflected or turned outwards by the barrier 7, and the front wheel 5 may be completely separated from the vehicle body while moving over the chamfer surface 15.

According to an exemplary embodiment, the chamfer surface 15 may be integrally formed with the lower portion of the outboard panel 22 by casting, pressing, or the like.

Figure 9:
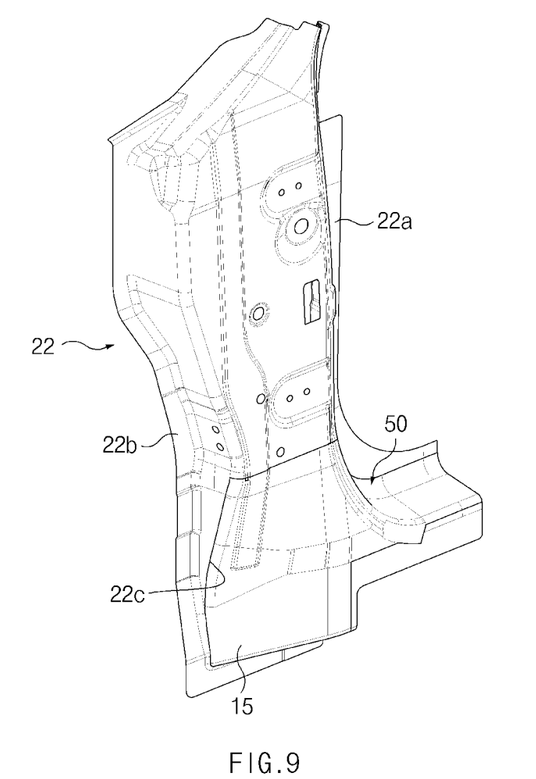
FIG. 9 illustrates an outboard panel of a front pillar lower of a vehicle body side structure according to an exemplary embodiment of the present disclosure.
Figure 10:
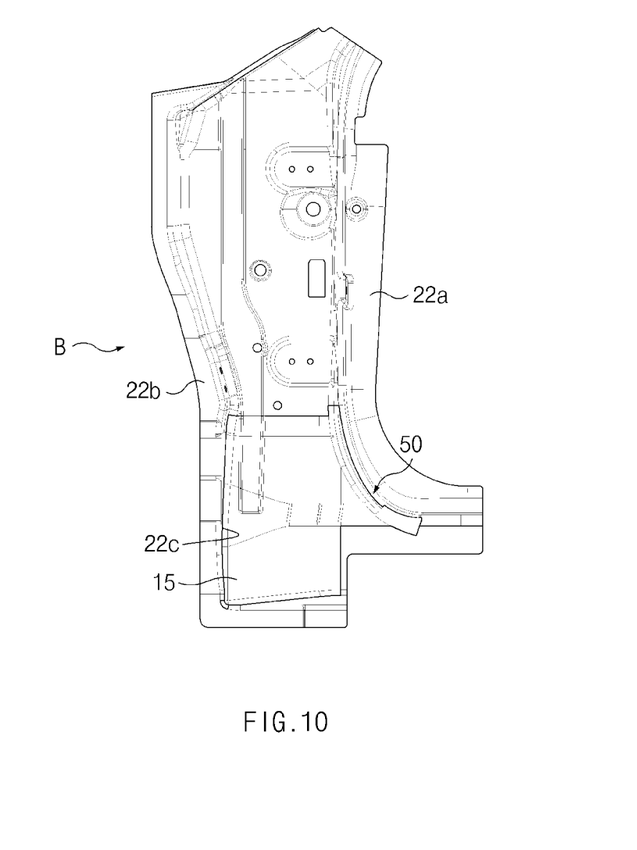
FIG. 10 illustrates a side view of the outboard panel illustrated in FIG. 9.
Figure 11:
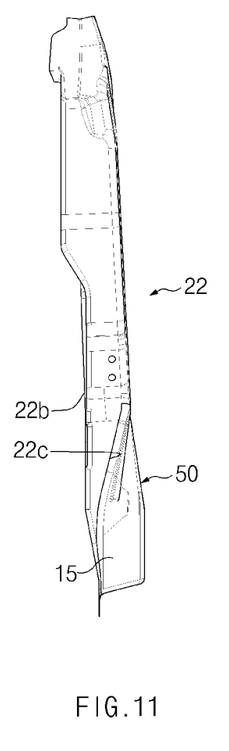
FIG. 11 illustrates a front view of the outboard panel illustrated in FIG. 9.

According to another exemplary embodiment, as illustrated in FIGS. 9 to 11, the outboard panel 22 of the front pillar lower 12a may have an opening 22C provided in the lower portion thereof, and a chamfer member 50 having the chamfer surface 15 may be mounted in the opening 22C of the outboard panel 22 using fasteners, welding, and/or the like. Accordingly, the chamfer member 50 may close the opening 22C of the outboard panel 22 in a sealed manner.

As set forth above, according to exemplary embodiments of the present disclosure, the front wheel may be deflected or turned outwards away from the vehicle during a frontal collision/impact or a small overlap crash so that the front wheel may be completely separated from the vehicle body, and the front wheel may be prevented from intruding into the passenger compartment. In particular, an impact load applied to the vehicle body may be significantly reduced, and thus crashworthiness may be improved.

According to exemplary embodiments of the present disclosure, as the chamfer-side reinforcement and the front portion of the side sill outer are located inside the front pillar, deformation of the vehicle body including the front pillar may be minimized even when the load is applied to the front pillar or the front wheel hits the front pillar during the collision of the vehicle.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle body side structure comprising:
   a front pillar located behind a front wheel, the front pillar comprising a chamfer surface that is diagonally inclined from a lower portion of the front pillar towards an interior of a vehicle, the chamfer surface being aligned with the front wheel in a longitudinal direction of the vehicle; and
   a side sill connected to the lower portion of the front pillar;
   wherein the front pillar comprises an inboard panel facing the interior of the vehicle and an outboard panel facing an exterior of the vehicle;
   wherein the outboard panel has an opening-side flange facing a door opening of the vehicle and a front flange facing a front of the vehicle; and
   wherein the chamfer surface extends from the opening-side flange of the outboard panel toward the front flange of the outboard panel.

2. The vehicle body side structure according to claim 1, wherein the chamfer surface is provided on a lower portion of the outboard panel.

3. The vehicle body side structure according to claim 2, wherein:
   the chamfer surface is located between the opening-side flange and the front flange; and
   a length of the chamfer surface is substantially equal to a distance between the opening-side flange and the front flange.

4. The vehicle body side structure according to claim 1, wherein:
   the chamfer surface is located between the opening-side flange and the front flange; and
   a length of the chamfer surface is substantially equal to a distance between the opening-side flange and the front flange.

5. The vehicle body side structure according to claim 1, wherein the front flange is offset from a longitudinal center plane of the front wheel toward the interior of the vehicle.

6. The vehicle body side structure according to claim 1, wherein a front portion of the side sill is interposed between the outboard panel and the inboard panel and is fixed to the lower portion of the front pillar.

7. The vehicle body side structure according to claim 6, wherein:
   the side sill comprises a side sill inner facing the interior of the vehicle and a side sill outer facing the exterior of the vehicle; and
   a front portion of the side sill outer is aligned with a lower portion of the chamfer surface.

8. The vehicle body side structure according to claim 7, wherein the front portion of the side sill outer has an auxiliary chamfer surface that is inclined to the interior of the vehicle and is aligned with the lower portion of the chamfer surface.

9. The vehicle body side structure according to claim 1, wherein:
   a longitudinal center line of the chamfer surface is substantially aligned with a wheel center line of the front wheel; and
   the longitudinal center line of the chamfer surface and the wheel center line of the front wheel are parallel to the longitudinal direction of the vehicle.

10. The vehicle body side structure according to claim 1, wherein:
    the chamfer surface is aligned with a middle region of the front wheel; and the middle region of the front wheel is a portion of the front wheel between a half point of a radius located above a center point of the front wheel and a half point of a radius located below the center point of the front wheel.

11. The vehicle body side structure according to claim 1, wherein a longitudinal center line of the chamfer surface is substantially aligned with a wheel center line of the front wheel.

12. The vehicle body side structure according to claim 1, wherein a longitudinal center line of the chamfer surface and a wheel center line of the front wheel are parallel to the longitudinal direction of the vehicle.

13. The vehicle body side structure according to claim 1, wherein the chamfer surface is located between the opening-side flange and the front flange.

14. A vehicle body side structure comprising:
   a front pillar located behind a front wheel, the front pillar comprising:
      an inboard panel facing an interior of a vehicle;
      an outboard panel facing an exterior of the vehicle, the outboard panel comprising an opening-side flange facing a door opening of the vehicle and a front flange facing a front of the vehicle; and
      a chamfer surface provided on a lower portion of the outboard panel extending from the opening-side flange of the outboard panel towards the front flange of the outboard panel, the chamfer surface being diagonally inclined from a lower portion of the front pillar toward the interior of the vehicle and being aligned with the front wheel in a longitudinal direction of the vehicle;
   a side sill connected to the lower portion of the front pillar; and
   a chamfer-side reinforcement disposed in an internal space between the inboard panel and the outboard panel, wherein the chamfer-side reinforcement is aligned with an upper portion of the chamfer surface.

15. The vehicle body side structure according to claim 14, wherein the chamfer-side reinforcement has an auxiliary chamfer surface that is inclined to the interior of the vehicle and is aligned with the upper portion of the chamfer surface.

16. The vehicle body side structure according to claim 14, wherein the chamfer-side reinforcement comprises a front flange fixed to the front flange of the outboard panel, a bottom flange connected to the side sill, and a rear edge spaced apart from the opening-side flange of the outboard panel.

17. The vehicle body side structure according to claim 14, further comprising:
   a fender apron member extending from the front pillar toward the front of the vehicle;
   a fender apron lower member diagonally extending from the fender apron member to the front pillar; and
   a fender-side reinforcement disposed in the internal space between the inboard panel and the outboard panel and located above the chamfer-side reinforcement, wherein a bottom end of the fender apron lower member is fixed to the fender-side reinforcement.

18. The vehicle body side structure according to claim 17, wherein the fender-side reinforcement is connected to the chamfer-side reinforcement.

* * * * *